2,770,879

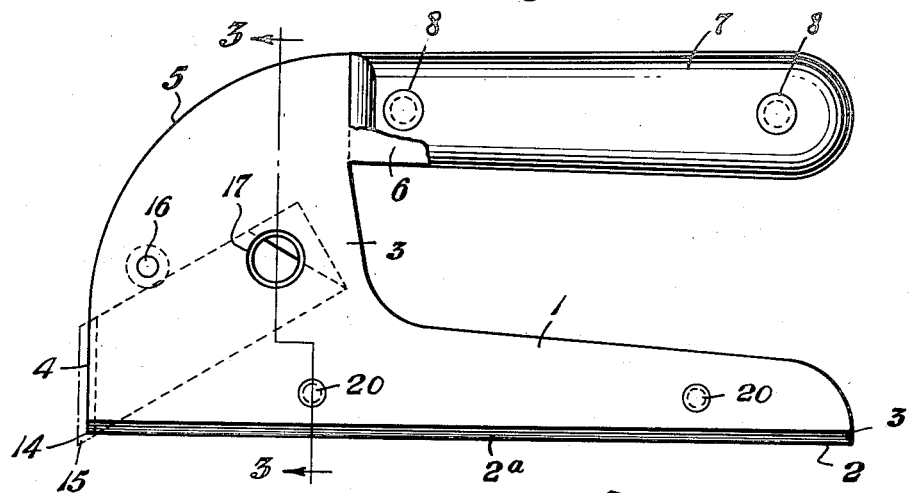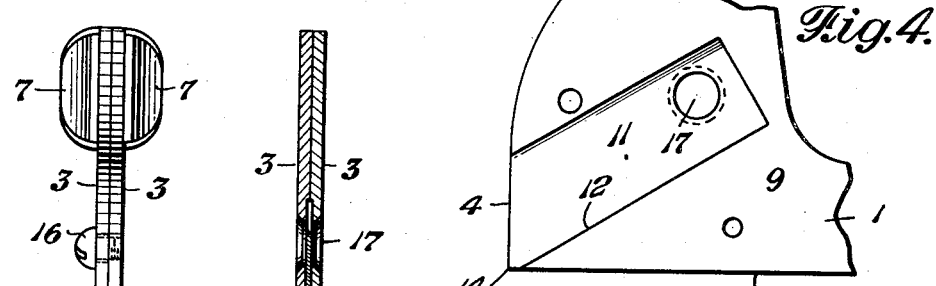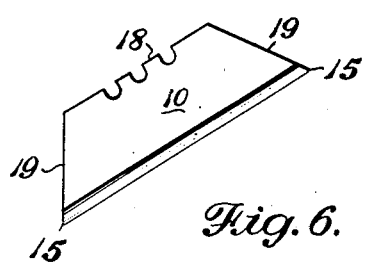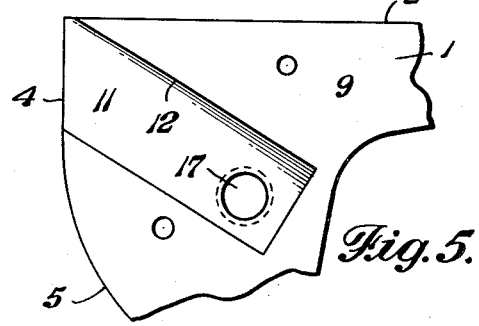
Nov. 20, 1956 — M. SEYMOUR — 2,770,879
COMBINED PRESSING, CREASING AND CUTTING TOOL FOR SEMI-FLEXIBLE MATERIAL
Filed Feb. 4, 1953 — 2 Sheets-Sheet 1
INVENTOR
Malcolm Seymour
BY Ralph T. Barrett
ATTORNEY Nov. 20, 1956     M. SEYMOUR     2,770,879
COMBINED PRESSING, CREASING AND CUTTING
TOOL FOR SEMI-FLEXIBLE MATERIAL
Filed Feb. 4, 1953     2 Sheets-Sheet 2
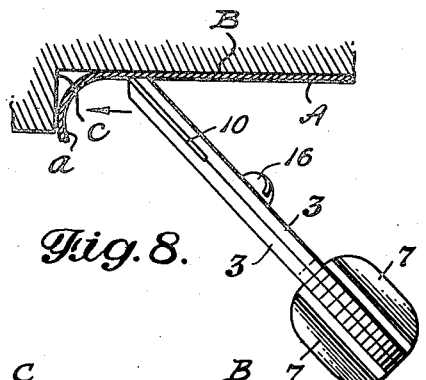
Fig. 8.
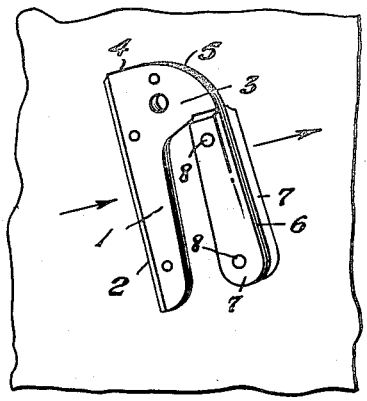
Fig. 7.
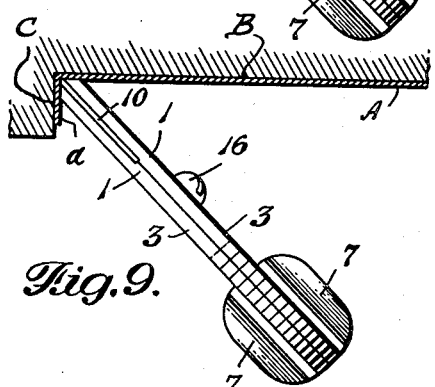
Fig. 9.
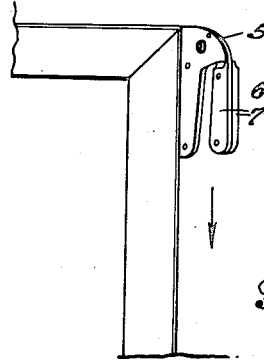
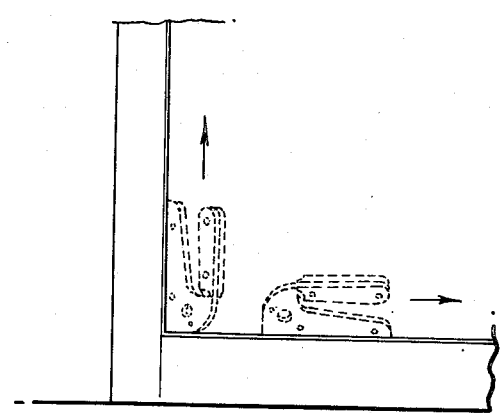
Fig. 10.
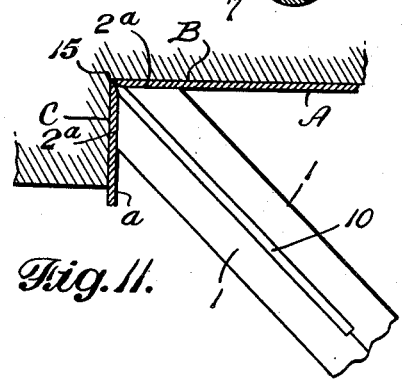
Fig. 11.
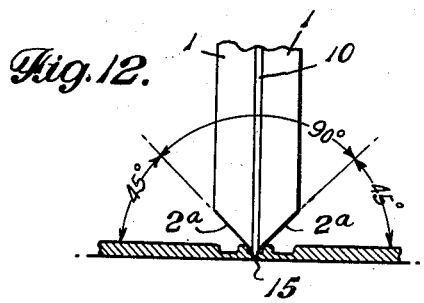
Fig. 12.
INVENTOR
Malcolm Seymour
BY Ralph F. Bassett
ATTORNEY

United States Patent Office 2,770,879
Patented Nov. 20, 1956

COMBINED PRESSING, CREASING, AND CUTTING TOOL FOR SEMI-FLEXIBLE MATERIAL

Malcolm Seymour, North Andover, Mass., assignor, by mesne assignments, to The General Tire & Rubber Company, Akron, Ohio, a corporation of Ohio Application February 4, 1953, Serial No. 335,138

2 Claims. (Cl. 30—293)

This invention relates to improvements in a combined tool for use in applying semi-flexible materials to walls, floors, and the like, including wallpaper and coated fabric.

One of the objects of the invention is to provide a tool which is capable of use by an operator through the several steps required in the proper application of a semi-flexible covering to a surface, these steps including the pressing of the material to the surface for adhesion and elimination of air pockets, the creasing of the material into angular and irregular surfaces, and the formation of permanent creases in the material to be utilized as guiding means for the cutter.

Another object of the invention is the provision of a cutting element which may be retracted into the confines of the implement when the latter is being used for its various functions other than cutting, and which cutting element may be readily adjusted for a cutting operation without the use of special tools.

Another object of the invention is the provision of a cutter which is capable of accurate functioning in association with a beveled straight line conveniently embossed in the surface of wall coverings of the semi-flexible type.

Further objects of the invention will more clearly hereinafter appear by reference to the accompanying drawings forming a part of the specification, in which like characters of reference designate corresponding parts throughout the several views, in which:

Fig. 1 is a side elevation of the invention;
Fig. 2 is a front elevation;
Fig. 3 is a section on line 3—3 of Fig. 1;
Fig. 4 is a fragmentary elevation showing the inside of one plate;
Fig. 5 is a similar view of the opposite plate;
Fig. 6 is a side elevation of the cutter element;
Fig. 7 is a plan view showing the implement used in applying wall covering to a wall and in the elimination of air pockets;
Fig. 8 is a view showing the device in use in positioning a wall covering at an abutment;
Fig. 9 is a similar view showing the position of the tool in creasing the covering material at the abutment;
Fig. 10 is an additional view showing the position of the device in forming a crease at abutments;
Fig. 11 is a similar view as in Fig. 9 showing a cutting operation at the abutment; and
Fig. 12 shows the invention used in cutting an embossed wall covering.

Referring now to Figs. 1 through 6, the structure of the implement is illustrated as including a pair of flat plate elements of similar shape and construction. Each plate member is formed with a relatively long base 1, having a straight edge 2 beveled throughout its length at substantially 45°, the bevel of each plate being identical, and the straight edge being continuous except at one end portion as hereinafter described to provide a smooth pressing and creasing edge when the plates are assembled. The forward end of each plate is formed with an upwardly extending head extension 3, the outer edge of which includes an upright portion 4 at right angles to the edge 2, and a rearwardly curved portion 5 which latter merges with the shank 6 to which the handle plates 7 are riveted at 8. The handle shank extension 6 overlies and is generally parallel to the base 1 so that an operator has full and uniform control of the entire working edge, regardless of the particular operation for which the tool is being used. The front end of the handle assembly is slightly reduced or tapered forwardly to provide a better gripping surface with the mass and weight generally forward. The abutting faces 9 of each of the complementary plates are flat to insure a flush fit between the parts.

A cutter 10, shown in Fig. 6, is adjustably associated with the structure for use when necessary in cutting the semiflexible material. The front end portions of the inner faces 9 of the plates are formed with complementary recesses 11 at their front ends, these recesses being of equal depth and being formed in the plates at an angle of approximately 30° from the straight edge of the assembly. The recesses 11 open at the front end of the plates with the lower walls 12 intersecting the straight edge 2 just rearward of the forward end 14 of the implement so that a working edge of the cutter 10 will project below the straight edge. Inasmuch as the length of the cutter 10 is less than the length of the recess provided therefor, when the plates are assembled, the cutter 10 may be wholly confined within the body of the implement when the latter is used for pressing or creasing operations. When the cutter is to be utilized it may have its working edge and corner 15 adjusted outwardly and downwardly to any extent desired by first loosening the clamp screw 16 and then by the insertion of a suitable implement in the registering opening 17, applying pressure in the direction of the length of the cutter 10, using the wall defining the opening 17 as a fulcrum. When the cutter is suitably adjusted to accomplish the required cutting operation, the clamp screw 16 may again be tightened. It will be noted that the notches 18 in the back edge of the cutter aid in the clamping operation as the metal wall structure of the side plates will tend to engage these notches under pressure of the clamping screw 16 which directly overlies the upper cutter edge.

It will be noted that the cutter 10 is formed with two working ends or points so that the cutter may be reversed when required. Each end 19 of the cutter 10 is formed at an angle from the bottom edge thereof of approximately 30° and inasmuch as the bottom edges of the recesses 11 are at a similar angle to the straight edge 2 of the tool, the ends 19 of the cutter 10 will in operative position be substantially at right angles to the straight edge 2.

It will be noted from the foregoing that the structure of the generally trapezoidal shaped blade 10 and the holder therefor is such that mutual cooperation of the parts insures convenient adjustment and required locking of the blade without the use of special tools and equipment. It will also be noted that inasmuch as the depth of each of the companion recesses 11 is the same and equal to one-half of the thickness of the cutter, the cutting edge, being at the medial longitudinal plane of the cutter, is inherently aligned with the apex of the angular finishing or smoothing edge 2 and the angular or beveled faces 3 form guides for the cutter during its use as will more clearly hereinafter appear. It will also be apparent to one skilled in the art that the central location of the cutting edge with respect to the beveled faces 3 of the holder insures proper alignment of the cut after the tool has been used for pressing or creasing the semi-flexible material, and thereby provides for the guiding of the cutting element in a straight line, or in a line previously determined by the pressing and creasing operation. It will also be noted that the companion plates of the assembly are normally permanently secured together by rivets 20, both of which are below and in alignment at the base of the structure and that the handle rivets 8 secure the upper parts together. This leaves a maximum span of material between the permanent fasteners, providing the required flexibility for the clamping screw 16 and facilitates the adjustment of the cutter in its seat.

Referring now to Figs. 7 through 12, there is illustrated generally some of the basic uses of the present invention. Normally the device is intended for use in connection with semi-flexible wall coverings of the type known as "Bolta Wall," although its use is also suitable in connection with other semi-flexible materials including wallpaper and coated fabric wall or floor covering. Heretofore, considerable difficulty has been experienced in applying heavier semi-flexible material and coverings, both in relieving air pockets between the covering and the surface being covered and also in pressing, creasing and cutting the material during its application.

In Fig. 7 the invention is illustrated in use in smoothing a covering on a wall, and particularly in removing air pockets, i. e. forcing air trapped between the covering and the wall outwardly during the laying operation. In this Fig. 7 the tool is illustrated as being operated in the direction of the arrow and with suitable pressure to secure a smooth surface, a firm application for adhesion between the covering and the wall, and the elimination of trapped air. It being understood, that the direction of movement of the tool will be determined by the direction of the free or unsecured margin of the material.

In Fig. 8 the wall covering A is illustrated as being applied to a surface B at a point approximating an angular abutment C. In this disclosure the movement of the tool in the direction of the arrow will secure a smooth surface by elimination of air pockets, by forcing pocketed air in the direction of the free edge *a* of the covering A. In Fig. 9 the covering A is shown as forced into the space at the junction of surface B and the abutment C, at which point the beveled faces insure a snug application of the material into immediate association with the wall structure including the area at the junction of the abutment C with the surface B.

Operations shown in Figs. 7, 8 and 9 are all accomplished with the cutter element 10 retracted within the holder structure which is the dotted line position E in Fig. 1. In these operations the beveled faces 3 function in pressing and smoothing the covering to the surface and into the angle of the surface. Normally at the junction of a wall and a shoulder, the material is preformed prior to the cutting operation in that a crease is produced in the material by the beveled faces 3 of the device, the beveled faces forming a guide groove to be followed by the operator during the cutting operation. When the covering A has been properly applied, the cutter 10 is adjusted by loosening the clamp screw 16 and inserting a suitable implement into the window 17 to force the cutter blade along its angular pathway until the cutter element is, in the estimation of the operator, projecting a suitable distance below the straight edge 2 to fully penetrate the wall covering without cutting or damaging the wall surface to which it is applied. Having secured the proper adjustment of the cutter 10 in its holder, the device may be moved in up and down direction as in Fig. 10, suitable pressure being applied to the tool to cut the full depth of the projecting edge of the cutter and simultaneously compressing the material in the path of movement of the latter, this providing a perfect angle joint without any feathering or ragging of the abutting edges along the marginal edges of the cut material. The pressure applied to the implement further insures positive adhesion of the material along the cut marginal edges. Due to the provision of the beveled edge 3 the implement is directly guided in its movement at all times when working at an abutment junction and at such junctions and corners a preliminary pathway is made by use of the tool before the cutter is projected, thus insuring accurate and guided movement of the cutter.

What I claim is:

1. In a device of the character described, a body structure formed of a pair of abutting complementary relatively thin plates having their bottom edges in registry and defining a straight edge portion, said straight edge portion being further defined by beveled edges formed at the bottom margin of said plates, a vertical projection at the forward end of said plates, a handle portion projecting rearwardly from the upper edge of the vertical projection and overlying the straight edge portion, fastening means securing the plates together longitudinally of and adjacent the straight edge portion, additional fastening means clamping the handle portions of the plates together, a cutting member clamped between said plates at their forward end and intermediate the fastening means, said cutting member having a cutting edge lying in the plane of the straight edge portion, means for adjusting said cutting member for projection beyond the straight edge portion, and means for clamping the cutting member in adjusted position.

2. In a device of the character described, a body formed of abutting plates, said plates having elongated bottom straight edge portions defined by angular faces forming uninterrupted creasing elements throughout the length of the straight edge portions, a recess formed between abutting plates of the structure for receiving a cutting element having a cutting edge, the cutting edge of the cutting element lying at an angle to the straight edge portions of the body and in a medial plane therewith, means for adjusting the cutting element for projection below the straight edge, means securing the plates together at their upper and lower marginal edge portions, and manual means for clamping the plates together adjacent said cutting element, whereby said cutting element may be secured in adjusted position.

References Cited in the file of this patent

UNITED STATES PATENTS

| | | |
|---|---|---|
| 1,574,641 | Christopherson | Feb. 23, 1926 |
| 1,871,968 | Ege | Aug. 16, 1932 |
| 2,018,149 | Randle et al. | Oct. 22, 1935 |
| 2,091,337 | Sahl | Aug. 31, 1937 |
| 2,473,551 | Stanley | June 21, 1949 |
| 2,567,102 | Cook | Sept. 4, 1951 |

FOREIGN PATENTS

| | | |
|---|---|---|
| 107,889 | Germany | Jan. 29, 1900 |